Feb. 10, 1942.  C. W. HIGH ET AL  2,272,802
BOB FOR FISHING LINES
Filed March 5, 1940
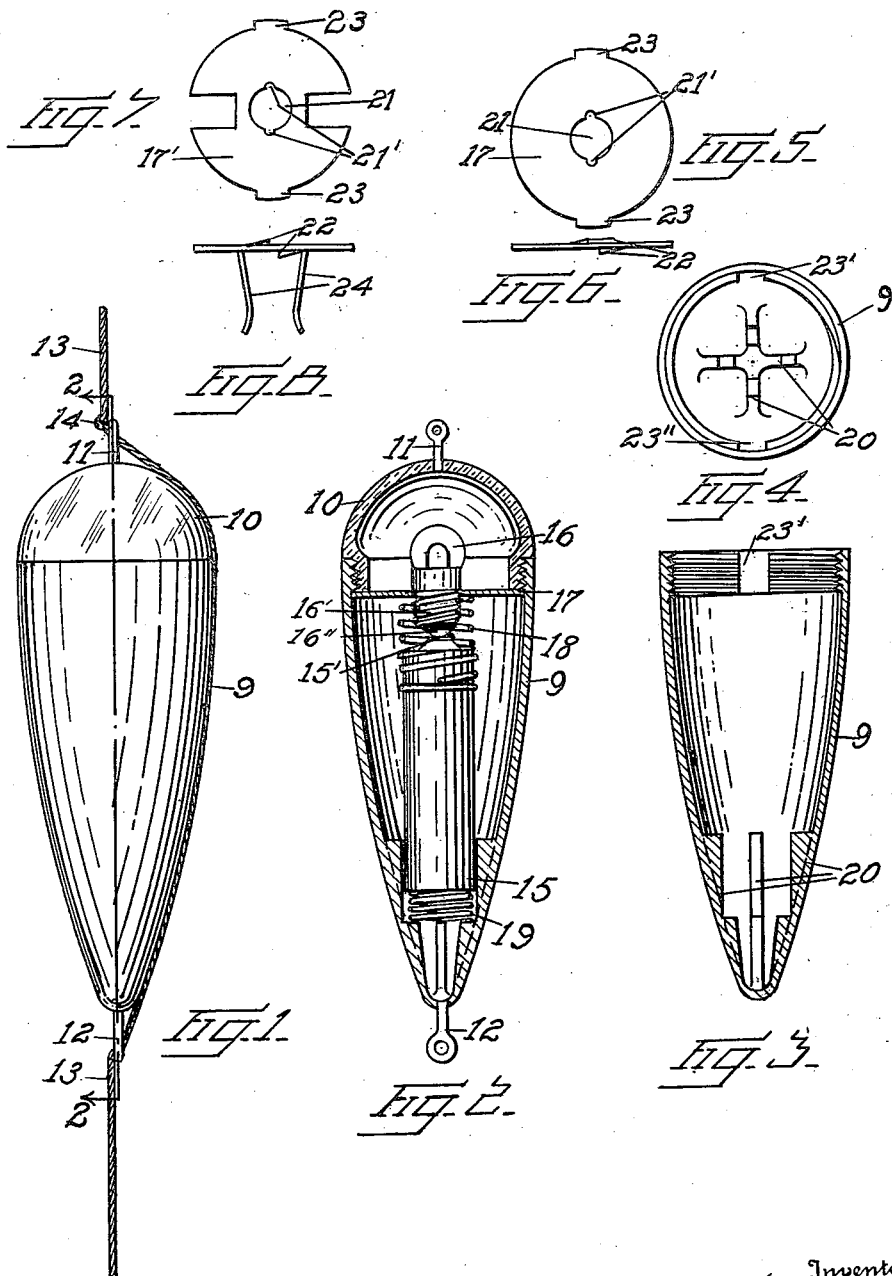

Patented Feb. 10, 1942

2,272,802

UNITED STATES PATENT OFFICE 2,272,802

BOB FOR FISHING LINES

Carl W. High and Edmund W. Roberts, Jr., Cincinnati, Ohio

Application March 5, 1940, Serial No. 322,360

3 Claims. (Cl. 43—49)

Our invention relates to a bob or float for a fishing line which may be used with equal advantage for fishing both in daylight and after dark. Those features of the invention which differentiate it from the other bobs for fishing lines are shown in the statements of the objects of the invention noted and in the description of the invention to follow.

One object of the invention is to provide means for continuous illumination of the bob after dark so that it can be kept in view all the time it is being used while fishing. The particular means we have provided therefor are the incorporation of an electric battery and an electric light bulb connected to the battery within the bob.

The applicants are aware that electrically lighted bobs for fishing lines have been devised and been patented heretofore, but with few exceptions they are provided with an electric switch so attached to the fishing line that the light will be turned on when a fish pulls on the line, the bob being unilluminated when the line is not in tension. Hence, during the time that the fish are not biting, the bob is invisible in the dark. It will be noted that the incorporation of such a switch requires that the fishing line be permanently attached to the switch. Therefore, the depth at which the hook and the sinker are to hang in the water below the bob must be regulated by the length of that portion of the fishing line between the sinker and its point of attachment to the switch on the bob. For this reason, when preparing to cast, that much line must extend byeond the end of the fish pole when the bob is drawn to the end of the pole. Should this part of the line be of much extent, there is danger that it may be caught in surrounding shrubbery while the pole is being whipped to cast the bob. It is to provide means to avoid this entanglement that is another object of our invention.

Another object of our invention is to provide such a construction that the lighting means may be removed for the purpose of renewal or to change the bob to an unlighted device for daylight fishing, and make the desired change in the minimum of time.

We attain these objects in the bob for fishing lines shown in the accompanying drawing in which we have shown the preferred form of our invention.

In the drawing:

Fig. 1 is a side elevation of a bob for fishing lines in accordance with our invention, showing the exterior of the bob.

Fig. 2 is a side elevation in section along line 2—2 of Fig. 1.

Fig. 3 is a sectional elevation of the lower portion of the casing by itself along line 2—2 of Fig. 1.

Fig. 4 is a plan or top view of the casing of Fig. 3.

Fig. 5 is a plan view of the disk bulb support shown at 17 in Fig. 2.

Fig. 6 is a side elevation or edge view of the disk of Fig. 5.

Fig. 7 is a plan view of an alternate form of disk.

Fig. 8 is a side elevation of the disk of Fig. 7.

In carrying out our invention the hollow bob is made in two sections 9, 10 detachably connected together in any suitable manner, preferably by means of the screw threads shown in the drawing, the adjoining edges of the sections so fitted that a water tight joint is provided at their juncture. The casing may be made of any suitable conformation, that shown in the drawing being the conventional form. The dome or upper section 10 is made of any suitable transparent or translucent material such as glass or Bakelite or a substitute therefor. It is customary to make the lower section 9 of opaque material. As will be noted, the sections may be separated for the removal or replacement of the contents of the casing.

Attached to the upper section 10 is an eyelet 11, and to the lower section 9 a similar eyelet 12. Both eyelets are provided with orifices suited to the free passage of the fishing line designated by the numeral 13. The orifice in eyelet 11, while of ample size to permit the fishing line to pass through it freely, is yet too small to permit a knot, such as designated by the numeral 14, from passing through it.

Within the casing is an electric dry-cell battery 15. Just above the battery is an electric light bulb 16 with the film end of the bulb positioned to dispense light rays through the section 10 of the casing. The light bulb is screwed into the center of the bulb support or disk 17, hereinafter referred to as the disk. The disk holds the bulb centrally of the casing. The disk is made of metal and therefore a conductor of electricity. An electric circuit is maintained between the threaded surface 16' of the light bulb base and the outer surface of the battery 15, its negative electrode, by means of the spring 18 which is fitted snugly to the outside of the battery and pressed against the underside of disk 17. Contact between the central electrode 15' of the battery and the central terminal 16" of the light bulb is secured by the upward thrust of spring 19 between the bottom of the battery and the lower end of the casing.

Within section 9 of the casing are ribs 20 extending inward from the wall of the casing, and devised to maintain the lower end of battery 15 midway of the casing. With the battery so guided, alignment of terminals 15' and 16" is assured. Ribs are used instead of solid material to avoid excess material and thereby maintain the buoyancy of the bob at a maximum.

As shown in Figs. 5 to 8, inclusive, the disk 17 and its alternate form 17' of Figs. 7 and 8 are provided with a circular opening 21 in the center thereof. In the edges of openings 21 are provided notches 21' designed to permit the edges of openings 21 to be bent outward as indicated at 22 to conform to the threads 16' on the light bulb base when the bulb is screwed forcibly through the disk. Projections 23, integral with the disks, are adapted to register with notches 23' provided in the threaded portion of casing section 9. The notches permit the insertion of the disk into the casing below the threaded portion thereof. When the casing section 10 is screwed into place in section 9, with the disk in place below the threads, the disk may lie against the under surface of section 10 to be held there, with bulb 16 in place, by the thrust of spring 19. In the alternate form of disk 17', shown in Figs. 7 and 8, the function of spring 18 is fulfilled by the resilient fingers 24 integral with the disk. Fingers 24 are adapted to grip the outer wall of battery 15 and serve as conductors from the outer zinc surface of the battery to the threaded portion 16' of the light bulb base.

In the operation of our invention, with the fishing line 13 threaded through eyelets 11 and 12, the fisherman ties a knot 14 in the line. This knot is so located on the line that, when it is in contact with eyelet 11, that portion of the line extending below the bob is of just the right length to permit the sinker and the hook to descend to the desired depth below the surface of the water.

Since the guide rings on the average fish pole will permit a knot to pass through them, the line may be reeled in until the sinker near the end of the line pulls the bob against the end of the pole. There being then a comparatively short portion of the fishing line beyond the end of the pole, the chance of the line becoming entangled in the shrubbery when making a cast is remote. After the cast has been made and the bob settles on the surface of the water, the line is allowed to go slack and the sinker may descend until the knot is in contact with eyelet 11.

Fitted with battery 15 in place and in electrical connection with the bulb 16, the bob is prepared for fishing after dark. The light from the bulb, passing through casing 10, indicates the position of the bob on the water and permits it to be kept in view continuously. Any disturbance of the bob, such as would result from a fish taking the hook, can be seen instantly. For fishing in daylight, the battery, the bulb, either one or both may be removed in a moment.

It may be noted that the sole advantage of a switch for lighting up the bulb when the hook is seized is a saving in cost of operation by extending the life of the battery and the bulb. When it is considered that the life of a battery suited to the bob is two hours and the cost is but 5¢ and that the life of the light bulb is four to five hours and the cost is but 10¢, it is to be seen that four hours fishing after dark would entail an outlay for light of but 20¢. The comparative advantages of our invention with a bob for fishing lines fitted with a switch lie in its greater simplicity of construction and consequent lower cost of manufacture, together with its adaptability to the customary modus operandi in casting. Actual trials in fishing with our invention after dark and its enthusiastic reception by night fishermen show it a great improvement in the art.

Another advantage of having the lamp continuously in circuit, illuminating the bob, is the ability to see the bob while casting, and to note where the line is after the cast; as for instance, if the fisherman does not accurately cast, he can at once detect the fault, and recast the line. At night, if the float has its lamp switched off except in case of the fish taking the hook, such action as the above is largely guess work on the part of the fisherman.

We claim:

1. A bob for fishing lines comprising a hollow casing made up of two sections detachably connected together with a water tight joint, the lower section tapered downwardly, the upper section of an approximately hemi-spherical form, the upper section comprised of translucent material, an electric battery within the casing, an electric light bulb within the casing, the filament end of the bulb in the upper section, the bulb disposed with its central terminal in electrical contact with the central terminal of the battery, a metal disk disposed beneath the upper section of the casing, the disk being adapted to receive the threaded portion of the bulb and to support the bulb centrally of the casing, electrical conducting means comprising a spring between the disk and the outer surface of the battery, and a second spring between the lower end of the battery and the inside lower end of the casing.

2. A bob for fishing lines comprising a hollow casing made up of two sections detachably connected together with a water tight joint, the lower section tapered downwardly, the upper section of an approximately hemi-spherical form, the upper section comprised of translucent material, an electric battery within the casing, an electric light bulb within the casing, the filament end of the bulb being in the upper section, the bulb being disposed with its central terminal in electrical contact with the central terminal of the battery, a metal disk disposed beneath the upper section of the casing, the disk being adapted to receive the threaded portion of the bulb and to support the bulb centrally of the casing, electrical conducting means comprising a spring between the disk and the outer surface of the battery, a second spring between the lower end of the battery and the inside lower end of the casing, and the second spring being adapted to hold the central terminal of the battery in electrical contact with the central terminal of the light bulb.

3. A bob for fishing lines comprising a hollow casing made up of two sections detachably connected together with a water tight joint, the upper section made of translucent material, a disk beneath the upper section, a light bulb screwed in the center of the disk, the glass end of the light bulb in the upper section, an electric battery disposed centrally of the lower section, the central terminal of the battery in electrical contact with the central terminal of the bulb, means for maintaining the outer surface of the battery in electrical contact with the outer surface of the bulb base through the disk, and said means comprising a helical spring gripping the outer surface of the battery and in contact with the disk.

CARL W. HIGH.
EDMUND W. ROBERTS, Jr.